Aug. 25, 1964  A. J. COBERT  3,145,803
CENTRALIZED LUBRICATION SYSTEM
Filed Oct. 9, 1962

United States Patent Office

3,145,803
Patented Aug. 25, 1964

3,145,803
CENTRALIZED LUBRICATION SYSTEM
Arthur J. Cobert, 309 S. Union St., Concord, N.C.
Filed Oct. 9, 1962, Ser. No. 229,379
3 Claims. (Cl. 184—7)

The present invention relates to a centralized oiling system adapted for supplying oil to the many oiling points of each of a large number of machines.

The invention is herein disclosed as embodied in an oiling system for a battery of knitting machines.

It is a principal object of the inventon to provide an effective and economical system for supplying oil to a large number of machines and to insure that the proper amount of oil is distributed to each and every oiling point throughout the system.

More specifically it is an object of the invention to distribute a lubricant such as oil under pressure and in accurately metered small quantities to each of a very large number of oiling points which may be bearings or discharge tubes and which are adapted to receive and use the oil furnished thereto.

A feature of the invention consists in the provision of a force feeding system of lubrication for the distribution of lubricant under pressure to a very large number of terminal oiling points; said system having a source of supply, a main high pressure pump adapted to be operated at intervals to drive oil into the system under successive surges of pressure, a number of distributing lines from said pump each of which is connected with an injector valve and is adapted to be rendered operative by each successive surge of pressure to force a metered amount of lubricant into a number of branch conduits, each said branch conduit including a self-contained flow control fitting adapted for feeding lubricant at a pre-determined low rate to the terminal oiling point.

Figure 1:
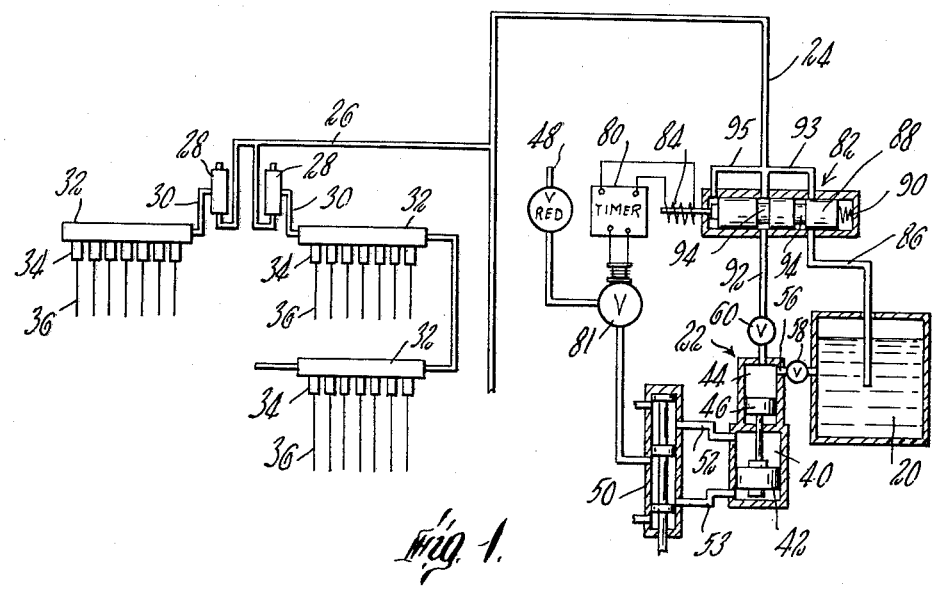
Figures 2, 3, 4:
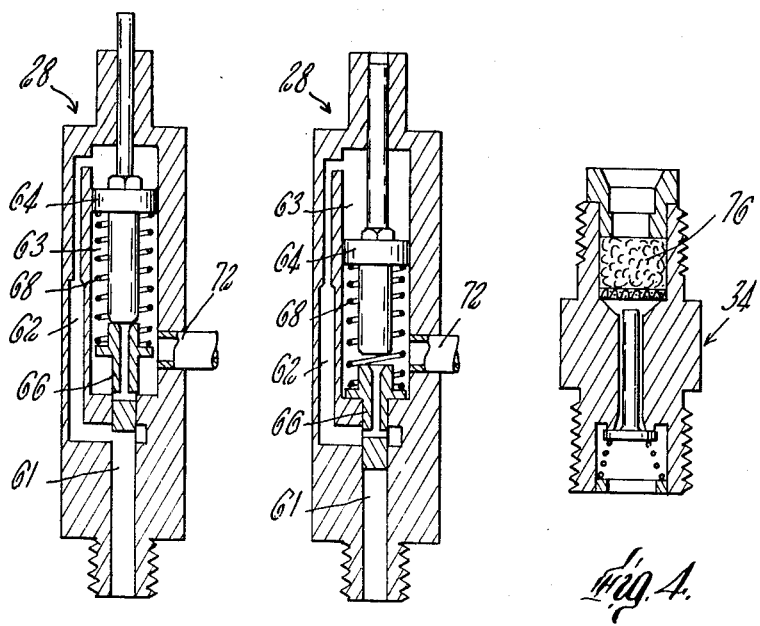

With the above and other objects in view as may hereinafter appear the several features of the invention consist also in the devices, combinations and arrangement of parts hereinafter described and claimed which together with the advantages to be obtained thereby will be readily understood by one skilled in the art from the following description taken in connection with the accompanying drawings in which:

FIG. 1 is a diagrammatic view of a centralized lubrication system suitable for distributing oil to a number of oiling points in a plurality of machines;

FIGS. 2 and 3 are similar sectional views of an injector valve by means of which oil is forced into a secondary oil distributing system, FIG. 2 showing the valve in its primed position with the plunger raised, and FIG. 3 showing the valve in its discharged position in which the plunger has been moved downwardly to eject a metered amount of oil into the secondary system and in which the plunger has again started upwardly during the valve recharging operation; and FIG. 4 is a sectional view of a self-contained control flow fitting by means of which a regulated amount of oil is permitted to flow to a particular oiling point.

Referring more particularly to the drawings, a lubrication system is provided which is adapted for supplying lubricant as, for example, oil from a central reservoir to a number of machines and for thereafter distributing said lubricant to a substantial number of oiling points simultaneously in each of said machines. It is contemplated that as many as 500 circular knitting machines may be connected to receive oil simultaneously from said reservoir and that each individual machine may have as many as 100 oiling points to be serviced.

The system comprises basically a variable pressure pump adapted for supplying oil in successive high pressure surges into a closed oil distributing network having a number of distributing lines, one such distributing line being directed to each of the machines to be lubricated. Each said distributing line is provided at its outer end with an injector valve of the general type which is rendered operative by each successive high pressure surge in the distributing system to force a metered amount of lubricant into a number of branch conduits leading therefrom. The injector valve is primed and the pressure thereto is sharply reduced so that the valve is reset for a next oil discharge operation. The branch conduits from each metering valve constitute a secondary closed oil distributing system of which each branch conduit has formed therein a self-contained control flow fitting including a check valve and a restricted orifice capable of feeding lubricant to the desired oiling point at a definite rate. The arrangement is such that oil is supplied positively under a very substantial pressure throughout the primary distributing area so that an excess supply of oil at high pressure may be provided at desired intervals to each of the metering valves which form the outlet from the primary distributing area. The precisely metered amount of oil which is forced through each metering valve into the secondary distributing system associated therewith is forced equally to all of the branch conduits because of the resistances introduced therein which prevent excessive loss of oil at any one oiling point which would in effect rob the branch lines leading to other oiling points of the secondary closed oil distributing system. It will be noted that the injector valves which are operated by high pressure surges in the system operate substantially as secondary metering pumps well adapted for the discharge of a metered amount of lubricant at pre-determined intervals into each secondary oil distributing area, and further that the self-contained flow control fittings by means of which the oil is released at each oiling point converts these surges of oil flow into a relatively constant and extremely limited flow of oil to the desired oiling point.

Referring more particularly to the drawings, oil is drawn from a main reservoir 20 by means of an air operated stallable pump 22 into a main feed line 24. Line 24 may have connected thereto a substantial number of distributing lines 26 in a range from one or more to several hundred, each of which is connected with a metering injector valve 28. It will be understood that the pump 22, the main line 24, and the branch lines 26, and metering injector valves 28 connected thereto form a closed oil pressure system.

From the injector valve 28 oil passes through a line 30 to a manifold 32 which has connected thereto a series of self-contained flow control fittings 34, each of which is connected by a terminal end 36 with a specific oil point of the machine. The connections from the metering valve 28 which include the line 30, the manifolds 32 and each of the self-contained flow control fittings 34 form integral parts of a secondary closed oil distributing system.

The stallable pump referred to may be of well-known description and is shown in the diagram FIG. 1 as an intensifier piston type pump having a large diameter cylinder 40 housing a piston 42 and connected thereto a small diameter cylinder 44 housing a piston 46 which is connected to be driven by the piston 42. Compressed air is supplied to the pump from a supply line 48, through a reversing valve 50, and connections 52, 53 at opposite ends of the cylinder 40. During the retracting movement of the pistons, oil is drawn into small diameter cylinder 44 through an inlet pipe 56 from the reservoir 20 having a check valve 58 therein and is forced into the distributing system above described through line 24 past a check valve 60 during the return movement of the pistons. When the pump is operating, oil pressure is built up within the system to a maximum value which may for example be set at 940 p.s.i. (lbs. per square inch) at which point the pump will stall through inability of the compressed air to operate the piston against the increasing oil pressure in the cylinder 44.

The injector valve 28 above referred to may be of ordinary description. However, one such valve suitable for use in the illustrated embodiment of the invention is specifically shown in FIGS. 2 and 3 of the drawings. The injector valve 28 comprises a casing with an inlet 61 connecting with a central chamber 63 and with a bypass conduit 62 which connects both its upper and lower ends with said chamber. Within the upper portion of the chamber is provided a valve member 64 and toward the lower end of the chamber a slide valve member 66. A compression spring 68 coiled about a solid downward extension of the valve member 64 is arranged to engage with and bias the valve member 64 in an upward direction to the position shown in FIG. 2 and to bias the slide valve 66 downwardly. The operation of the valve may be briefly stated as follows:

Assuming that the pump 22 is started, the pressure in the system starts to build up, incoming lubricant pressure moves the slide valve 66 upwardly as shown in FIG. 2 sufficiently to permit oil to pass through the bypass 62 and thence downwardly against the upper face of the piston 64. As the pressure reaches approximately 500 p.s.i., the piston is moved downwardly acting first to displace lubricant from a discharge chamber provided beneath the lower end of the downward extension of piston 64 through a discharge conduit 72. The continued movement of the piston 64 pushes the slide valve 66 downwardly far enough to shut off the incoming lubricant. When the lubricant pressure in the supply line is vented or released the slide valve 66 closes fully thus opening a port to the bypass line 62 leading to the measuring chamber. The spring 68 now moves the valve member 64 upwardly which transfers lubricant in a reverse direction through the bypass line 62 through a transverse port in the slide valve 66 into an axial bore therein whence it moves upwardly to refill the discharge chamber of the valve for the next cycle.

The self-contained flow control fittings 34 are utilized to provide a carefully regulated amount of oil at each individual oiling point. As specifically shown on an enlarged scale in FIG. 4 of the drawings, the fitting 34, which may be of ordinary construction, comprises a casing having mounted in the upper end thereof a filter 76 adapted to be connected with any one of the branch conduits to which oil is distributed to the oiling point. Adjacent this fitting there is provided a small tubular passageway which constitutes a metering orifice and at its lower end abuts a check valve which prevents a reverse flow of oil into the system.

Electrical connections are provided for operating the lubricating system in accordance with an automatic cycle in which the pump is started to bring the primary oil distributing system up to pressure. These connections include a timer 80 which operates an air pressure shut-off valve 81 which is in turn connected to supply air under pressure to the reversing valve 50, thereby to put the pump in operation. It will be understood that mechanism is provided for automatically reversing the valve 50 at each end of the pump piston stroke. The pump will continue to operate until the maximum pressure in the primary distributing system reaches approximately 960 p.s.i. when the pump stalls owing to the inability of the compressed air at the pressure supplied which may, for example, be 40 p.s.i. to overcome the resistance of the oil. When the pressure in the system has been built up to about 500 p.s.i., each of the individual injector valves 28 in the system will be operated to force a small amount of oil which may be in the order of .015 cubic inch of oil into each secondary oiling system which in turn causes a minute amount of oil to be forced through each of the terminal fittings above described. The oil pressure built up in the primary oil distributing system by the pump may be permitted to remain for a substantial interval of time as, for example, 90 seconds or even longer.

At the end of this waiting period the timer operates to de-energize a solenoid operated bypass valve 82 which is connected into the line 24. This is a three-way valve which acts when the solenoid 84 is de-energized to shut off the line to the pump while at the same time the line 24 is connected by a line 86 with the reservoir 20 so that a small amount of oil is bled from the line 24 and the pressure in the primary distributing system is thus reduced. The bypassing valve 82 is so constructed that when the pressure of oil line 22 reaches a low value, which may be in the order of 60 p.s.i., the bypassing valve 82 returns to its initial position to prevent further loss of pressure.

The bypassing valve 82 as shown in FIG. 1 comprises a casing in which is housed an axially shiftable valve member 88 which is acted upon at one end by spring 90 and at its other end by the solenoid 84. The valve is provided with a high pressure inlet 92 from the pump 22 and with an outlet port connected with the line 24. A land 94 formed in the valve member is arranged for the operating position of the valve to connect the inlet 92 with the line 24. For bypassing there is also provided from line 24 a conduit 93 which is connected by a land 94 in the valve member 88 with the exhaust line 86. A second bypass line 95 from line 24 connects with the left hand end of the valve so that pressure is exerted tending normally to shift the valve to an off position against the pressure of spring 90. When the valve is in operating position, the valve member 88 is held to the left by the solenoid 84 against the pressure of the fluid passing through the line 24.

When the bypass valve 82 is to be opened to reduce the pressure in the primary oil distributing system the timer 80 operates to de-energize the solenoid 84. The valve member 88 is moved to the right by the pressure of the oil against the pressure of spring 90 shutting off the inlet port 92 from the pump and connecting line 24 with the exhaust line 86. The arrangement is such that when the pressure in the line 24 acting on the left hand end of the valve member 88 reaches approximately 60 p.s.i., the spring 90 will operate to again shift the valve to its operating position.

The present system provides a novel and highly efficient apparatus for the delivery of very small metered amounts of oil from a single pump and reservoir to the several oiling points in a number of machines. The combination of the primary high pressure oil distributing system and the secondary closed high pressure injected oiling systems connected thereto permits the sure delivery of oil from the pump to each local distributing point. The use of a high pressure injection system in small amounts within the machine avoids the risk of oil leakages and over supply to some areas. The use of the injector valves at the local distributing points has the advantage that these valves which are readily operated by pressure surges in the supply line, operated as secondary pumps to force a metered amount of oil into a secondary closed pressure oil distributing system which causes a metered amount of oil to be delivered through each self-contained flow control fitting. The fact that the secondary oil distributing systems as well as the primary oil distributing system are maintained under a very substantial pressure is of importance to insure the delivery of equal amounts of oil through each individual fitting in the system.

The invention having been described, what is claimed is:

1. A centralized lubricating system for a plurality of machine units having a lubricant supply, a lubricant pressure pump, a primary high pressure lubricant distributing system comprising a plurality of distributing pipe lines connected with said pump, a device connected into said distributing pipe lines acting when actuated to reduce the pressure in said pipe lines and a lubricant injection valve at the terminal end of each said distributing pipe line having lubricant ejection and recharge mechanism operated by successive pressure surges from supply for the ejection of successive metered amounts of lubricant and to be recharged upon reduction of said pressure, a secondary closed pressure injected lubricant distributing system connected with each said injection valve comprising a branch line from said injection valve having a manifold therein, a plurality of lines from said manifold to points of lubrication, each said line incorporating therein a self-contained flow control fitting comprising a metering orifice and a check valve, and operating means for said system comprising means for recurrently operating said pump to build pressure of said lubricant in said primary lubricant distributing system, and thereafter actuating said device for reducing said pressure in said primary high pressure lubricant system to produce recurrent pressure surges in said lubricant distributing system.

2. A centralized lubricating system for a plurality of machine units having a lubricant supply, a lubricant pressure pump, a primary high pressure lubricant distributing system comprising a plurality of distributing pipe lines connected with said pump, and a lubricant injection valve at the terminal end of each said distributing pipe line having lubricating ejection and recharge mechanism operated by successive pressure surges from supply for the ejection of successive metered amounts of lubricant and to be recharged upon reduction of said pressure, a secondary closed pressure injected lubricant distributing system connected with each said injection valve comprising a branch line from said injection valve having a manifold therein, a plurality of lines from said manifold to points of lubrication, each said line incorporating therein a self-contained flow control fitting comprising a metering orifice and a check valve, and operating means for said system comprising means for recurrently operating said pump to build pressure of said lubricant in said primary lubricant distributing system, a bypass valve connected between the pump and said high pressure lubricant distributing system operable to disconnect the pump and to connect said high pressure distributing system with exhaust, and including means rendered operative by a reduction of the pressure in said system to return said valve to pump connected position, and means operable after each successive pump operation to actuate said bypass valve.

3. A centralized lubricating system according to claim 2 in which the pump is a stallable air driven pump capable of producing a primary high pressure in the order of 940 p.s.i., and the bypass valve has means operable to return the valve to the pump connected position for a minimum pressure in the order of 60 p.s.i., and an electric timer is provided to initiate the operation of the pump and thereafter of said bypass valve.

References Cited in the file of this patent

UNITED STATES PATENTS

| | | |
|---|---|---|
| 1,968,000 | Wupper | July 24, 1934 |
| 2,145,245 | Bijur | Jan. 31, 1939 |
| 2,328,812 | Klein | Sept. 7, 1943 |
| 2,499,571 | Davis | Mar. 7, 1950 |
| 3,031,032 | Dinkelkamp et al. | Apr. 24, 1962 |